US009002845B1

(12) United States Patent
Melbourne et al.

(10) Patent No.: US 9,002,845 B1
(45) Date of Patent: *Apr. 7, 2015

(54) SYSTEMS AND METHODS OF ANALYZING CHANGES AND DATA BETWEEN HIERARCHIES

(71) Applicant: Aquire Solutions, Inc., Irving, TX (US)

(72) Inventors: Ross Melbourne, Irving, TX (US); Brad Winsor, Lake Bluff, IL (US); Lois Melbourne, Irving, TX (US)

(73) Assignee: Aquire Solutions, Inc., Irving, TX (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/783,386

(22) Filed: Mar. 3, 2013

Related U.S. Application Data

(63) Continuation of application No. 12/893,890, filed on Sep. 29, 2010, now Pat. No. 8,447,755.

(60) Provisional application No. 61/246,969, filed on Sep. 29, 2009.

(51) Int. Cl.
G06F 7/00 (2006.01)
G06F 17/30 (2006.01)

(52) U.S. Cl.
CPC ................... G06F 17/30289 (2013.01)

(58) Field of Classification Search
None
See application file for complete search history.

(56) References Cited

U.S. PATENT DOCUMENTS

| 5,406,477 | A | | 4/1995 | Harhen |
| 5,611,035 | A | * | 3/1997 | Hall ............................... 345/440 |
| 5,829,003 | A | * | 10/1998 | Okura .................................. 1/1 |
| 6,216,140 | B1 | * | 4/2001 | Kramer ........................... 715/234 |
| 7,870,510 | B2 | * | 1/2011 | Kamino .......................... 715/853 |
| 7,953,694 | B2 | * | 5/2011 | Colossi et al. ................ 707/600 |
| 8,447,755 | B1 | | 5/2013 | Melbourne et al. |
| 8,538,911 | B2 | | 9/2013 | Kass et al. |
| 2003/0028546 | A1 | * | 2/2003 | Keller et al. .................. 707/100 |
| 2006/0218160 | A1 | | 9/2006 | Bhatia |
| 2008/0046805 | A1 | | 2/2008 | Shewchenko et al. |
| 2008/0052316 | A1 | | 2/2008 | Rangadass |
| 2009/0070359 | A1 | | 3/2009 | Nolan |
| 2009/0119309 | A1 | * | 5/2009 | Gibson et al. ................. 707/100 |
| 2009/0240726 | A1 | | 9/2009 | Carter et al. |
| 2010/0049766 | A1 | | 2/2010 | Sweeney et al. |

(Continued)

FOREIGN PATENT DOCUMENTS

WO WO 2007/081666 A2 * 7/2007 ............. G06F 17/30

OTHER PUBLICATIONS

Non-final Office Action mailed May 9, 2012 in corresponding U.S. Appl. No. 12/893,890, 25 pages.

(Continued)

Primary Examiner — Uyen Le
(74) Attorney, Agent, or Firm — Fish & Richardson P.C.

(57) ABSTRACT

There is disclosed various embodiments of computer systems and methods for analyzing multi-dimensional trends from two dimensional hierarchical data by comparing and analyzing two hierarchies and their associated attributes. Certain embodiments may comprise: providing a database of previous time slice data, receiving new time slice data, comparing the new time slice data to the database of previous time slice data, generating additional attributes, incorporating the additional attributes and the new time slice data into the database so that analysis may be performed between the two hierarchies.

24 Claims, 10 Drawing Sheets

(56) References Cited

U.S. PATENT DOCUMENTS

| | | |
|---|---|---|
| 2010/0082691 A1 | 4/2010 | Jaster et al. |
| 2010/0199223 A1 | 8/2010 | Colner |
| 2010/0275263 A1 | 10/2010 | Bennett et al. |
| 2010/0306720 A1 | 12/2010 | Pikus et al. |
| 2010/0318492 A1 | 12/2010 | Utsugi |

OTHER PUBLICATIONS

Notice of Allowance mailed Dec. 26, 2013 in corresponding U.S. Appl. No. 12/893,890, 8 pages.

Non-final office action dated Jul. 17, 2012 from U.S. Appl. No. 12/894,114, 10 pages.

Final office action dated May 21, 2013 from U.S. Appl. No. 12/894,114, 10 pages.

Non-final office action dated Mar. 10, 2014 from U.S. Appl. No. 12/894,114, 13 pages.

Final office action dated Jun. 4, 2014 from U.S. Appl. No. 12/894,114, 21 pages.

\* cited by examiner

SYSTEMS AND METHODS OF ANALYZING CHANGES AND DATA BETWEEN HIERARCHIES

RELATED APPLICATIONS

This application is a continuation of U.S. application Ser. No. 12/893,890 filed Sep. 29, 2010, entitled "Systems and Methods of Analyzing Changes and Data Between Hierarchies," which claims priority to and the benefit of U.S. provisional application Ser. No. 61/246,969, filed on Sep. 29, 2009. This application is also related to the co-pending and commonly assigned U.S. application Ser. No. 12/894,114 filed Sep. 29, 2010. All of the above disclosures are hereby incorporated by reference.

BACKGROUND INFORMATION

Technical Field

The present application is generally related to analyzing hierarchical data and specifically to computer systems and methods for comparing and/or analyzing multi-dimensional trends from two dimensional hierarchical data.

At a basic level, hierarchical data may be defined as data having parent-child relationships. Such data is often represented in graphical form or chart as a tree or tree structure. The structures are named "tree structures" because the classic representation resembles a tree, even though the tree charts are often inverted compared to an actual tree. In other words, usually the "root" is at the top of the chart and the branches are at the bottom.

The tree charts may also be used as a form of node-link diagrams. In classical node-link diagrams, entities called "nodes" are connected with line segments, which are often called "branches"

Often, an organizational chart is an inverted tree chart where the nodes may be employee positions within the company. Organizational charts are often used to show the employment structure of an organization. However, hierarchical charts may also be used to visualize many types of information, such as a biological evolutionary tree, or a pyramid selling scheme, bill-of-materials, encyclopedia entries, or syntax phrases in linguistics.

Hierarchical charts are generally displayed in two dimensions. Two dimensional charts are fine for relatively static subjects, such as syntax phrases or biological evolutionary trees. For relatively dynamic subjects, such as for an organizational chart of a company, a pure two dimensional analysis may be limited because any such analysis will only be based on a particular moment in time. What is needed, therefore, are methods and systems which allow comparing and analysis of hierarchical data in multiple dimensions.

SUMMARY

There is disclosed various embodiments of a system and method for analyzing n-dimensional hierarchical data by comparing at least two hierarchies and their associated attributes. Certain embodiments may comprise: providing a database of previous time slice data, receiving new time slice data, comparing the new time slice data to the database of previous time slice data, generating additional attributes, incorporating the additional attributes and the new time slice data into the database so that analysis may be performed between the two hierarchies.

The foregoing has outlined rather broadly certain features and/or technical advantages in order that the detailed description that follows may be better understood. Additional features and/or advantages will be described hereinafter which form the subject of the claims. It should be appreciated by those skilled in the art that the conception and specific embodiment disclosed may be readily utilized as a basis for modifying or designing other structures for carrying out the same purposes. It should also be realized by those skilled in the art that such equivalent constructions do not depart from the spirit and scope of the appended claims. The novel features, both as to organization and method of operation, together with further objects and advantages will be better understood from the following description when considered in connection with the accompanying figures.

It is to be expressly understood, however, that each of the figures is provided for the purpose of illustration and description only and is not intended as a definition of the limits of the appended claims.

DETAILED DESCRIPTION

Figure 1A:
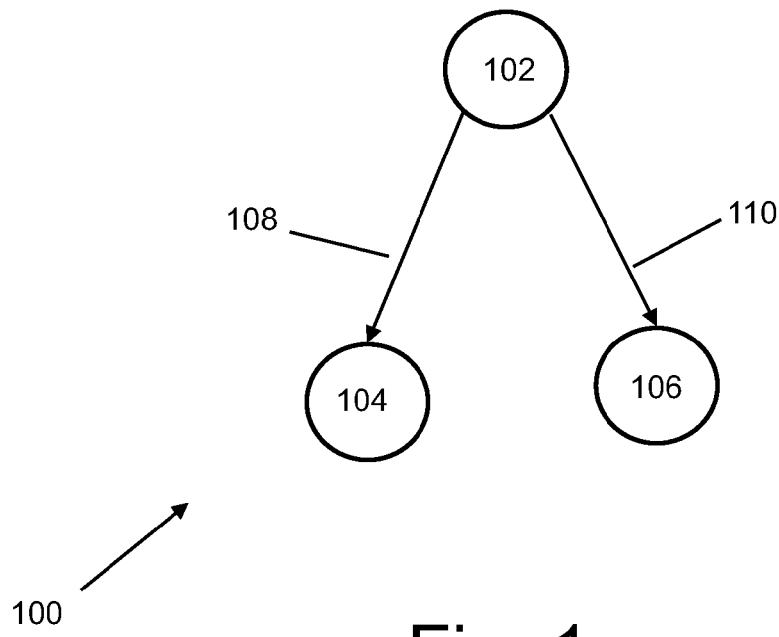
FIG. 1a is an organization chart illustrating a simple hierarchal structure.

For the purposes of promoting an understanding of the principles of the present invention, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

When directions, such as upper, lower, top, bottom, clockwise, counter-clockwise, are discussed in this disclosure, such directions are meant to only supply reference directions for the illustrated figures and for orientated of components in the figures. The directions should not be read to imply actual directions used in any resulting invention or actual use. Under no circumstances, should such directions be read to limit or impart any meaning into the claims.

A simple exemplary chart representing a structure, such as an organization 100, is illustrated in FIG. 1a. There are three nodes 102, 104, and 106 connected by two links or lines 108 and 110. In this exemplary chart, node 102 is considered the "parent" of the child nodes 104 and 106. Data representing the relationship of the nodes is defined as structural data for the purposes of this patent application because such data can be used to define the structure of the hierarchy.

Figure 1B:
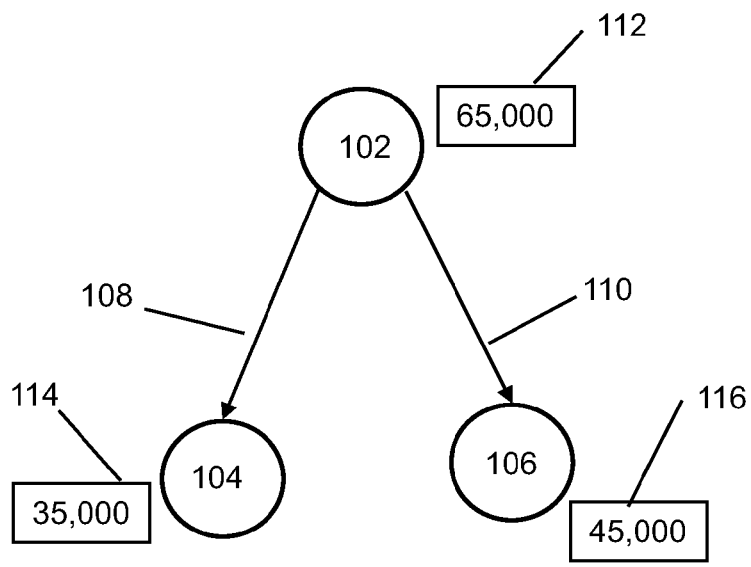
FIG. 1b is an organization chart illustrating a simple hierarchal structure with attributes associated with nodes of the hierarchal structure.

FIG. 1b is another exemplary chart for the organization 100. However, in this chart, attributes are associated with each node. The attributes are represented by boxes or fields. For instance, an attribute for node 102 may be contained in the box 112. Similarly, the attribute for node 104 may be contained in box 114 and an attribute for node 106 may be contained in box 116. Although only one box is indicated in this simplified example, there may be hundreds of attributes associated with each node in an actual chart representing a business organization.

Depending on the organization and the purpose of the hierarchy, attributes may either be raw data or derived data. In this example, one attribute, such as the attribute representing salary for a job position associated with node 102 is $65,000. This is an example of raw data or a "received attribute" because it represents actual data associated with node received from an outside source. Similarly, the value of the salary attribute for node 104 is $35,000 contained in box 114 and the value for the salary attribute for 106 is $45,000 contained in box 116.

Figure 1C:
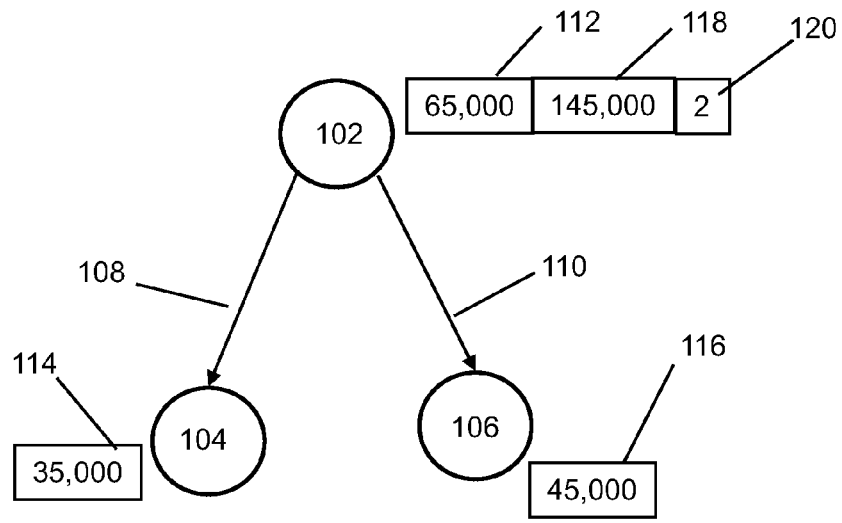
FIG. 1c is an organization chart illustrating a simple hierarchal structure with additional attributes associated with nodes of the hierarchal structure.

When the nodes of an organization chart structure have attributes associated with them, then a meaningful analysis may be performed with the chart structure. For instance, by "rolling up" or summing the values of all of the attributes 114, 116, and 112, one may be able to determine that the total salary expense for this organizational structure is $145,000. Such rollup calculations may then be stored with node 102 as a new "calculated attribute" 118 showing a summation of the salaries within the structure as indicated in FIG. 1c. In this example, illustrated by FIG. 1c, another "calculated attribute" in box 120 could be a number representing the number of child nodes under a particular node. Such calculated attributes may be considered to be "in-plane" or "in-slice" attributes because they are preformed on two dimensional structures or hierarchies representing actual organizations at any particular moment in time.

The type of attributes to be analyzed may depend on the type of hierarchical data and a first predetermined set of criteria or filter definition list defining the data is to be analyzed. For instance, in FIG. 1c if the hierarchical data represents an organization where each node represents a job position, the first set of criteria could define the types of data to be analyzed for each node, such as job position, the employee in the position, salary, benefits costs, performance etc.

Figure 2:
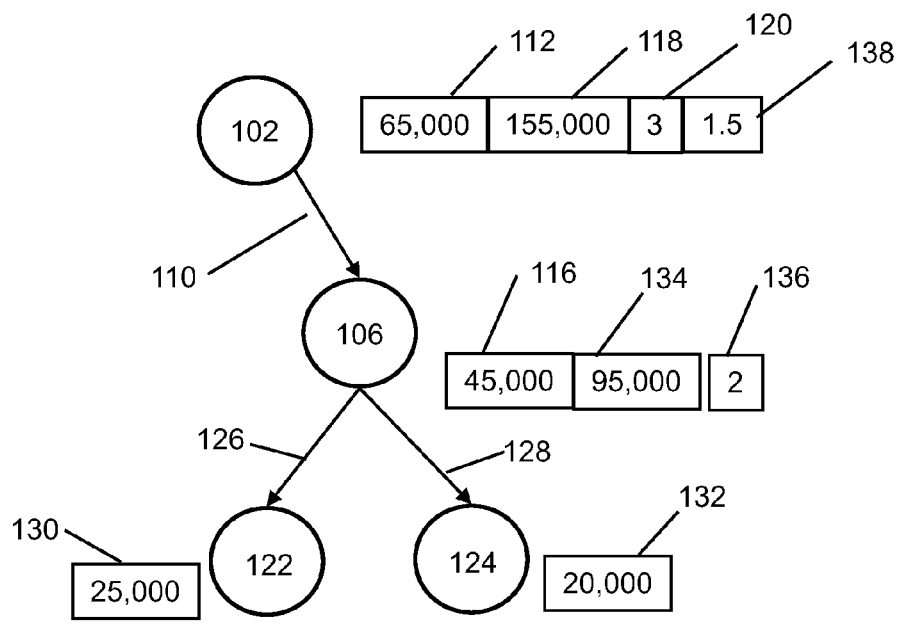
FIG. 2 is an organization chart illustrating a simple hierarchal structure with additional attributes associated with nodes of the hierarchal structure.

FIG. 2 is another exemplary chart representing the organization 100 at a different moment in time. For instance, FIG. 1c may represent the structure of the organization 100 on a particular date and FIG. 2 may represent the structure of the organization 100 at a later date. For purposes of this patent specification, a "time slice" will mean a two dimensional hierarchical representation of a structure and the data (whether raw or derived) associated with the structure at a given moment in time. Thus, FIG. 1c represents the structure and data of the organization at a first time slice and FIG. 2 represents the structure and data of the organization at a second time slice.

By comparing FIG. 2 to FIG. 1c, the reader will note that the structure and several attributes of the organization 100 have changed between the first time slice and the second time slice. For instance, the node 104 (FIG. 1c) has been eliminated. Additionally, the node 106 has two new child nodes 122 and 124 established by the links 126 and 128.

The values of the attributes in the second time slice of FIG. 2 have also changed. If one of the attribute of interest (defined by the first set of criteria) was salary, then box 130 indicates the salary associated with node 122 is 25,000. Similarly, the salary associated with node 124 is 20,000 in box 132. As explained above, these are examples of received or raw attributes. Note that the calculated attributes have also changed due to the change in the structure of the hierarchy of the organization 100. For instance, new calculated attributes for node 106 may be contained in the boxes 134 and 136. In this example, box 134 represents the salary expense for node 106 and every node under node 106 while box 136 represents the total head count reporting to node 106. Similarly, the values in boxes 118 and 120 associated with node 102 have changed. In this time slice, the total salary cost for the organization 100 is $150,000 as indicated by box 118 and the total positions below node 102 is 3 as indicated in box 120.

The calculated attributes discussed thus far use two dimensional data or "in-slice" data and thus represent attributes associated with a particular time slice or moment in time. Tracking trends from time slice to time slice is also possible and is useful in certain applications. The ability to track trends across different time slices of hierarchical data adds another dimension of analysis to what has traditionally been represented in only two dimensions.

For instance, certain attributes may represent rates of change between in-slice attributes from different time slices. For instance, the attribute represented by box 138 may represent the rate of change between the value of the attribute in box 120 of first time slice (FIG. 1c) and the value of the attribute in box 120 of the second time slice (FIG. 2). For purposes of this patent specification, the term "cross-slice calculated" attributes or cross-slice calculations refers to attributes that use data from different time slices as opposed to "in-slice" calculated attributes which uses data from within a single time slice. The rate of change in box 138 is an example of a cross-slice calculated attribute and shows a 50 percent rate of change between the first time slice and the second time slice. Cross-slice data may also be stored as time slice data.

In certain embodiments, cross-slice calculations are relatively easy to perform on static nodes, such as root nodes. However, cross-slice calculations become increasing difficult to perform the farther down the hierarchical structure one goes when structure of the hierarchy has undergone significant changes from one time slice to the next time slice. In order to perform cross-slice calculations under such conductions, the hierarchical structures from each time slice are compared to each other and the differences noted. The structural differences can then be stored as attributes of the nodes. Furthermore, some nodes in the new time slice will be gone (such as node 104 of FIG. 1c). However, in order to analyze trends of cross-slice attributes, tracking information about departed nodes may be desirable in certain situations.

Figure 3:
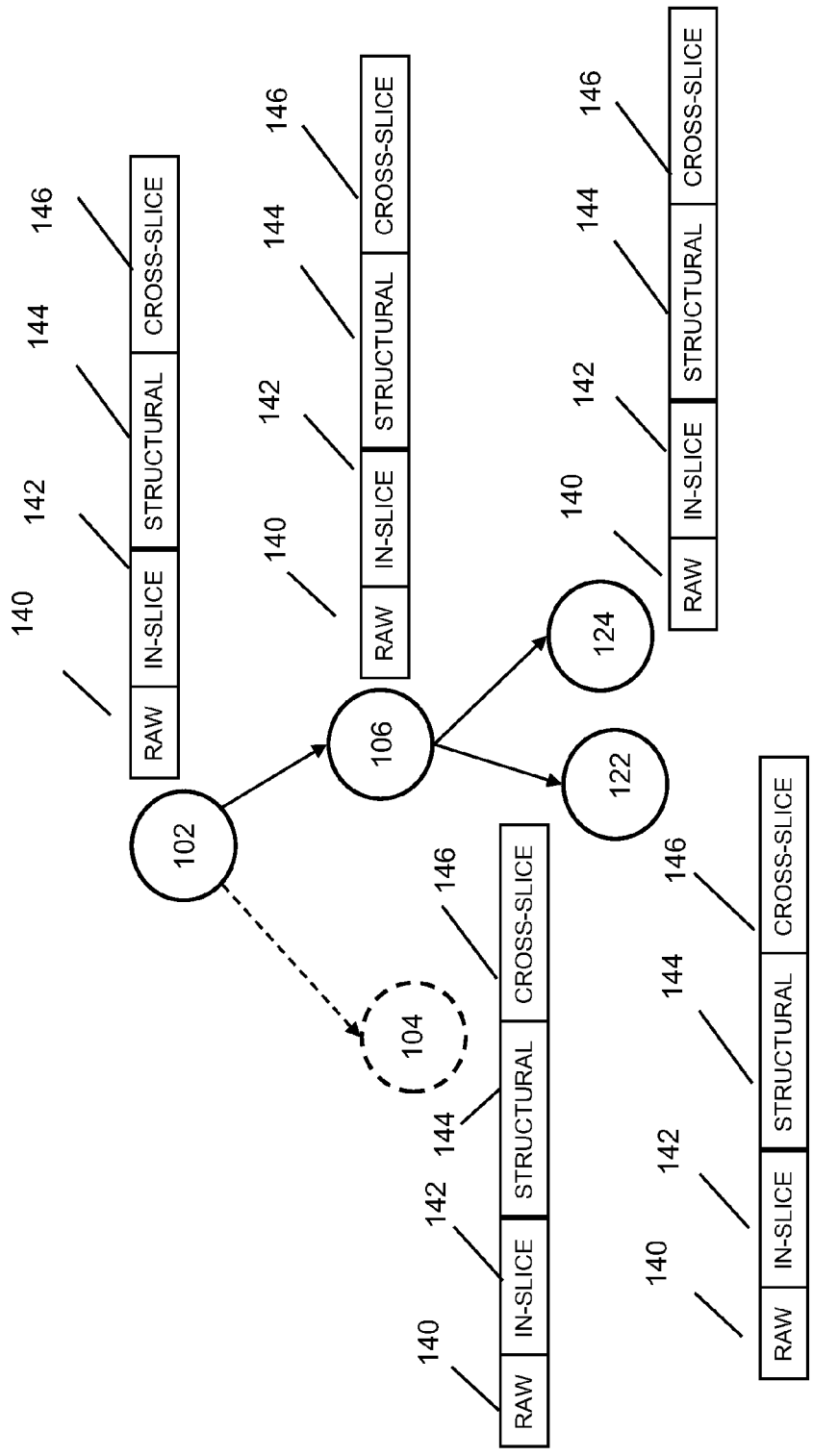
FIG. 3 is an organization chart illustrating a simple hierarchal structure illustrating exemplary attribute types associated with nodes of the hierarchal structure.

FIG. 3 represents an exemplary chart representing the organization 100 where exemplary "types" of attributes are displayed as opposed to actual values. For each node in the structure, for instance, node 102, there are "RAW" or received attributes 140 associated with the node. There may also be roll-up other calculations performed on various attributes of the current time slice which are labeled as "IN-SLICE" calculated attributes 142. Additionally, in order to perform complex trend analysis over multiple time slices, there may also be "STRUCTURAL" and/or "STRUCTURAL-CHANGE" or metric attributes 144 associated with each node. The structural-change attributes 144 track the structural changes that have occurred between the structures of hierarchies of each time slice. Node 104 and the associated link 108 are displayed in FIG. 3 using dashed lines to indicate that Node 104 is actually no longer in the current time slice. However, data from Node 104 may be useful in order to calculate the structural changes of the hierarchy from the first time slice to the second time slices. The structural and structural-change attributes 144 allow cross-slice calculations to occur.

In certain embodiments, cross-slice calculations may also be performed on any number of attributes (usually defined be one or more sets of predefined criteria). The results of such cross-slice calculations 146 may also be stored as attributes with the nodes as illustrated in FIG. 3.

Actual hierarchies may contain thousands of nodes. Depending on the specific application for the hierarchical analysis, each node may have attributes and combination of attributes. One or more sets of preconfigured criteria or filters is useful to determine which attributes, in-house calculations and cross-slice calculations are to be tracked for any give application.

Figure 4:
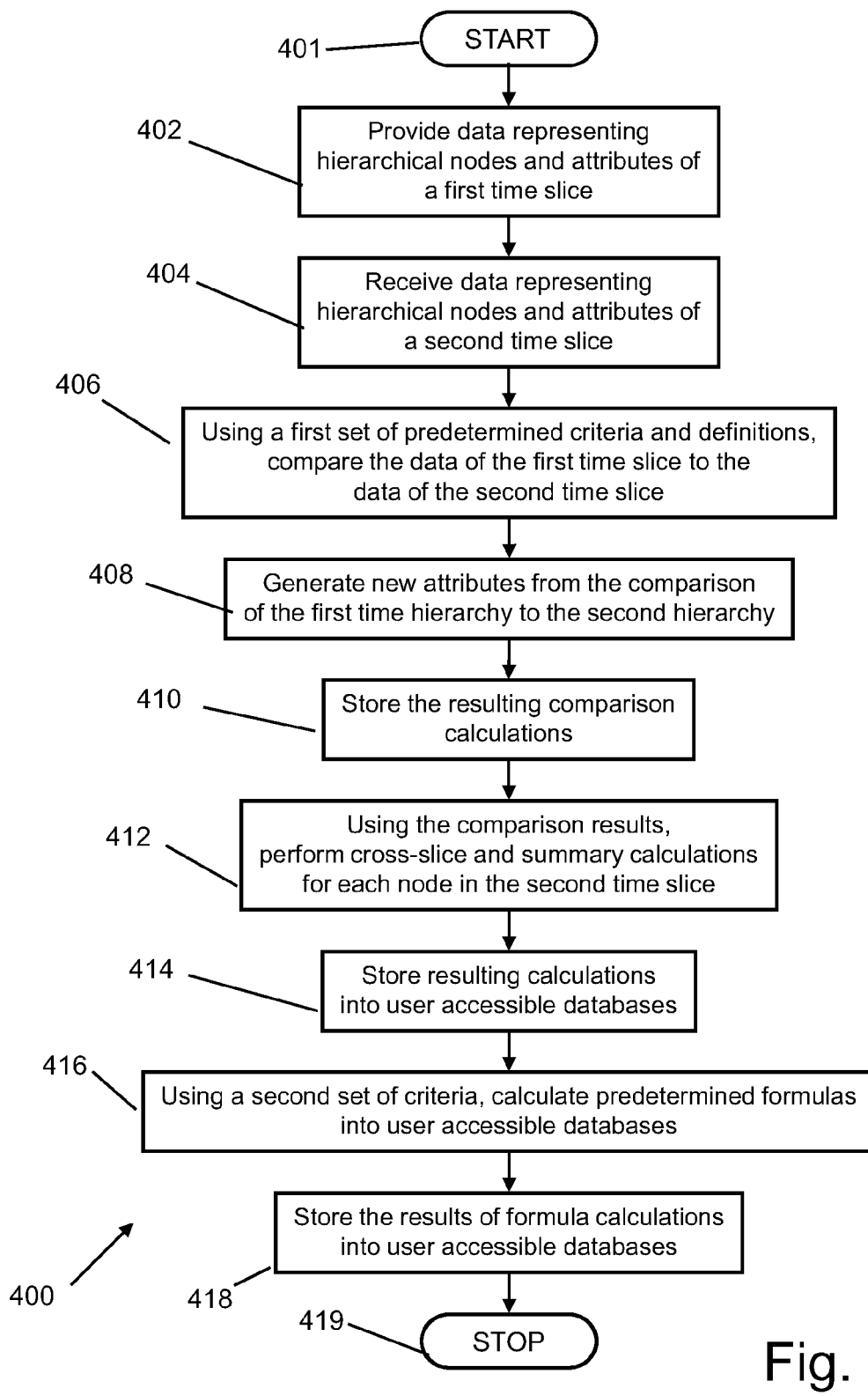
FIG. 4 is a flowchart illustrating a process which may incorporate various aspects of the present invention.

One embodiment of a general process 400 for performing in-slice and/or cross-slice calculations on hierarchical data is illustrated in FIG. 4. The process starts point 401, but the first step in the process 400 is step 402, in which data representing a hierarchy of nodes and attributes taken from a previous time slice is provided. The data in the previous time slice represents a first or previous hierarchy representing an organization as it existing at a previous time. The data stored with the first previous time slice may include the previous structure data, raw data, and in-slice data. Additionally, structural-change data, cross-slice data and other data may have been generated as a result of a previous comparison with an even earlier time slice may be stored with the previous time slice.

In step 404, data representing a hierarchy of nodes and attributes for a new or second slice is received. The new time slice may contain current structure data and raw data associated with the attributes of interest for each node in the hierarchy.

In step 406, using a list of configurable and predetermined criteria (or a filter definition list), the data of the first time slice may be compared to the data in the second time slice. This comparison results in the generation of structural-change data, which indicates the differences in the structures of the hierarchies. Additionally, other attributes between the two time slices may be compared. The differences between the two time slices are generated and tracked as new attributes or delta data in step 408.

In step 410, the resulting calculations and comparisons are stored in a database of some form. For instance, the data representing and related to the hierarchy could be stored in a planar table. In certain embodiments, the rows of the tables may represent the nodes of the hierarchy and the column fields associated with the rows may represent the various attributes. In such embodiments, the entire time slice database may be viewed as a series of tables. In other embodiments, relational or hierarchical databases may be used to store the resulting calculations.

In step 412, summaries or "roll-up" in-slice and cross-slice calculations are performed using the structural change data and the delta data for each permutation of nodal attribute and filter for the calculated data. In other words, for each node attribute, in-slice and cross-slice calculations occur based on the predetermined (and user configurable) filter criteria and the structural-change data and the delta data.

In step 414, the results of such calculations are stored in the database(s) associated with the second time slice. In certain embodiments, the results of the calculations may be accessible to an end user via a web server or another such accessing service. In other embodiments, additional processing may be desirable. For instance, averages, ratios, and other such formula may be defined in a second set of criteria and this criteria may be applied against the results of the databases created in step 414. Thus, step 416 is additional processing step in order to format the data and perform additional calculations which may be desirable to an end user. Step 418 is the storage step where such additional formatting and calculations are stored into the user accessible databases. This step may create new databases or additional fields in the existing databases. The process 400 ends at step 419.

In certain other embodiments, a portion or all of the data representing the various time slices from steps 410, 414, and 418 may be downloaded for use in other business applications, such as Excel.

In one embodiment, the process 400 may be implemented on any computing device of sufficient capacity, such as a personal computer or hand-held computing devices. The process 400 may also be implemented over a network or on a server in communication with a network. In one embodiment, the process 400 may be implemented using the system 500 illustrated in FIG. 5. For instance, current hierarchical data and raw data representing an actual organization is typically maintained by that organization or customer in a customer's database 502. In certain embodiments, at predetermined intervals, such data may be accessed by a customer's server 504 and sent to a time slice server 506 via a connection 507. The connection 507 may be direct or via the Internet or an intranet. In other embodiments, the data may be delivered on a physical storage device and read into the time slice server. In certain embodiments, the time slice server 506 stores the hierarchical data as a new time slice or hierarchy in one or more databases 508 coupled to the time slice server 506. When data representing a new time slice or new hierarchy is received, the time slice server performs a process similar to process 400 to generate user accessible databases containing the calculations and summary calculations generated as a result of process 400. These user accessible databases are then accessible via one or more web servers 510.

In certain embodiments, an end user 512 who wants to perform in-slice and cross-slice analysis for the organization may access the data generated by the process 400 via the one or more web servers 510. In such embodiments, the end user 512 may use a smart client to retrieve the generated data and display the generated data in a meaningful way. In other embodiments, the end user may simply use a conventional browser to access the data in the time slice databases 508. In some embodiments, few, if any calculations are necessary to be performed by the end user because every permutation of data based on the preconfigured filter data has already occurred and the resulting calculations stored in the time slice databases 510. The end user 512 using client software simply retrieves the previously calculated results for display or reporting by client software. Using client software, an end user, can then indicate any node in the organization 100, and any pre-calculated attribute associate with the node, whether it be in-slice or cross-slice attributes would be readily displayable and reportable for the user.

In other embodiments, the data generated by the process 400 and stored in the time slice databases 508 may be further manipulated by the end user 512 using client software or a stand alone application. In such embodiments, the end user 512 would then have has the ability to perform additional calculations on an ad hoc basis. Additionally, in certain embodiments, the end user 512 has the ability to download certain data from the time slice databases in standard formats so that the end user can perform additional calculations using standard business software such as EXCEL® and ACCESS®.

Typically, most organizations store business information in relational databases. Although certain embodiments, such as the process 400, do not dependent on relational databases, different embodiments of the present invention may use such relational tables and/or relational databases.

As previously discussed, in one embodiment, the data for each time slice may be stored in a planar table. A node in the hierarchy for that time slice could be a row in the table. Different attributes associated with each node may be stored in the column fields of the table. Additionally, differences between time slices may be stored as additional attributes in the table. So the time slice database may be viewed as a series of tables where the data in each table represent a hierarchy and its related attributes of interest at a particular time or time slice.

Rather than using one table, other embodiments may use several tables or databases to hold the various attributes associated with any given time slice. A description of certain example tables which may be used by certain embodiments is found below in Chart 1 and Chart 2. Chart 1 describes exemplary definition tables for defining predetermined criteria or configuration criteria which could be used in one embodiment on the present invention. Chart 2 describes exemplary data tables which could be used to store the data generated as a result of implementing a process incorporating certain embodiments of the invention. It is important to note that such table names, table definitions and table fields are provided as examples only. Other table names, table definitions, and data structures could be used and still be within the scope of the present invention.

Exemplary Definitional Tables
Chart 1

| Table Name | Table Description |
| --- | --- |
| Filter | Contains the filter definitions available to end users |
| Contains CalculatedField | definitions of fields to be calculated or processed, including the structural, in-slice, and cross-slice calculations to be performed. |
| Metric | Contains definitions for summary calculations |
| MetricDisplay | Contains definitions of formulas an end user might wish to display (such as formulas for certain averages, percents, ratios, etc.) |

Exemplary Data Tables
Chart 2

| Table | Description |
| --- | --- |
| Calculated Field Data | Intermediate data table that contains information on nodes and attributes which have been added, removed, or moved from the previous time slice. Rows are added to this table which contain values based on |

Exemplary Data Tables
Chart 2

| Table | Description |
| --- | --- |
| | filters and analysis of differences between time slices. Each calculated field (Type, SourceField, WhereClause) has a column in this table. This table contains one row for every row in ChartData. This chart includes the structural, in-slice, and cross-slice calculations results. |
| ChartData | This table contains data representing the nodes and parent- child relationships of the hierarchy. In other words, the structural data for the hierarchy. |
| MetricData | Contains intermediate data for the time slice and summary fields, counts, and raw data for every node in the hierarchy |
| MetricDataDisplay | User accessible table containing averages, percents, rates, and ratios using MetricData and definitions in MetricDisplay |

Figure 5:
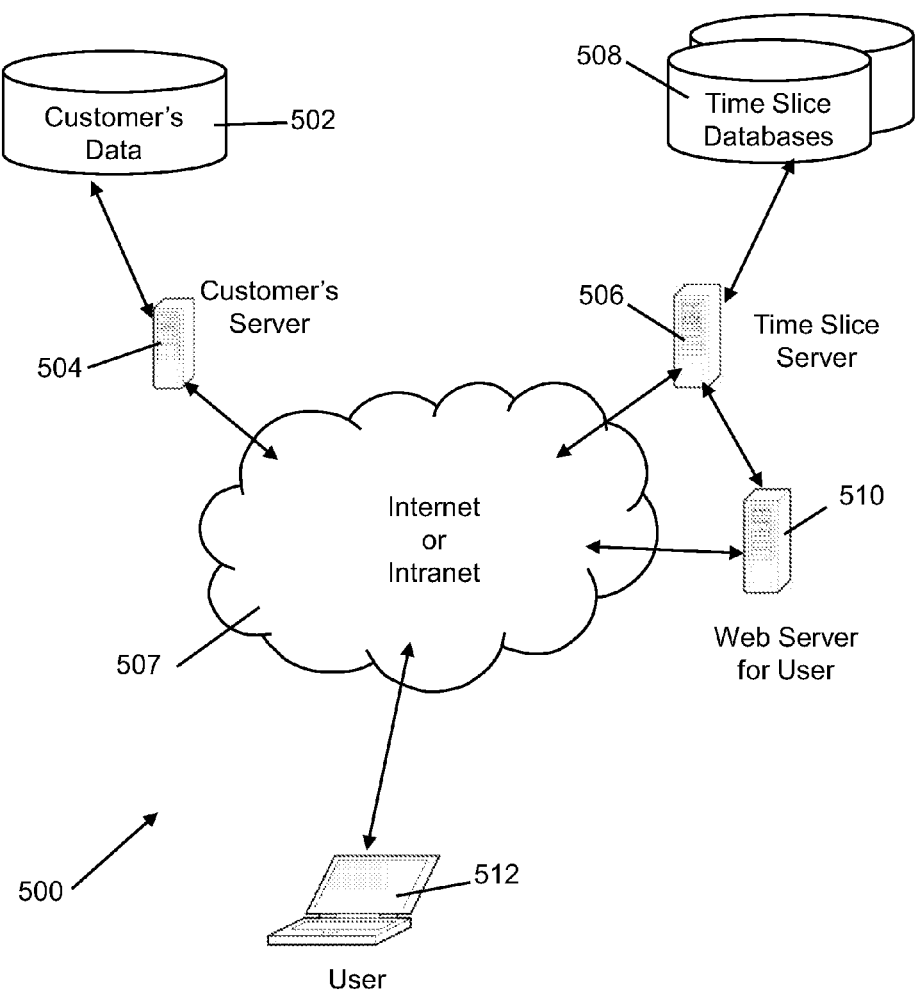
FIG. 5 is a conceptual diagram illustrating a system which may incorporate various aspects of the present invention.
Figure 6:
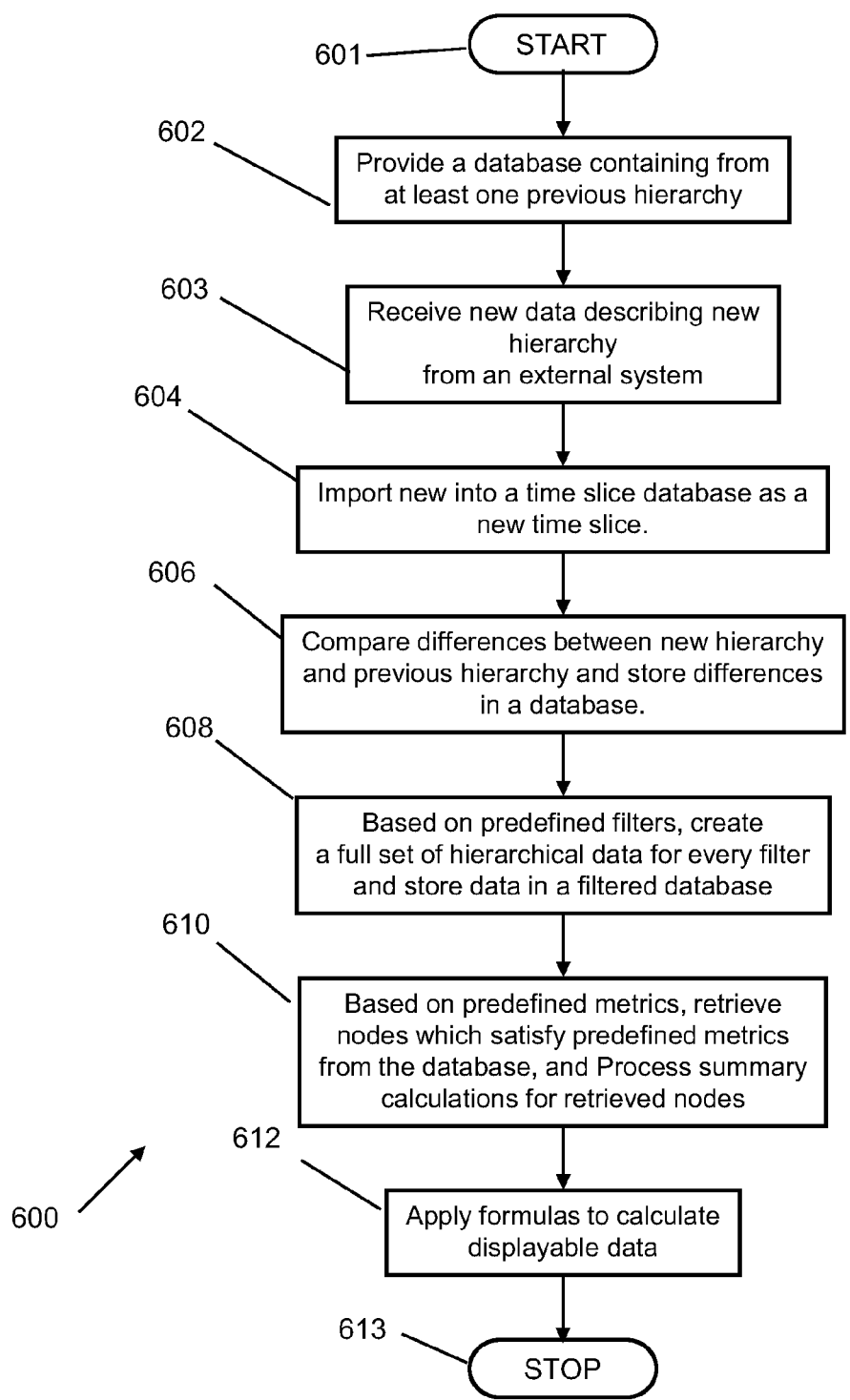
FIG. 6 is a flowchart illustrating a process which may incorporate various aspects of the present invention.

FIG. 6 illustrates one embodiment of an exemplary process 600 which may run on the time slice server 506 of FIG. 5 and use the exemplary tables and/or databases described in Chart 1 and Chart 2.

The process starts point 601, but the first step in the process 600 is step 602, in which data representing a hierarchy of nodes and attributes taken from a previous time slice is provided. In step 603, new data representing nodes and attributes for a new hierarchy (i.e., new hierarchical data) is received (either from a communication as described in reference to FIG. 5 or from a data storage device, such as a DVD or USB hard drive). In certain embodiments, the new hierarchical data is extracted from the received data. The extracted data may be written as rows in a staging database. Each row may represent a node in an organization or the current or new hierarchy. Attributes in each row represents the parent-child relationships between the nodes. Once the structural data is written in a staging database, the data may be read into a time slice database, such as the ChartData table which contains structural and raw hierarchy data for a particular time slice (step 604). It should be noted, that although a staging database is used in certain embodiments, in other embodiments, once the new data is received, it may be written directly to a time slice database or table, such as the ChartData table described in Chart 2.

In step 606, the new hierarchical data from the ChartData table is compared to previous hierarchical data in the time slice database based on the definitions of the fields from the CalculatedField tables. The differences are flagged as new attributes in the CalculatedFieldData tables. During this step, rows may be added to the CalculatedFieldData table that contain values based on the Metric and Filter definition tables described above in Chart 1 (i.e., sets of criteria). Exemplary fields in the CalculatedField table may be "Type" which defines the type of calculation field (as below defined in Chart 3). The "SourceField" is used for calculated field types which allows for values from the ChartData table to be moved to the ChartFieldData table. In certain embodiments, this field specifies the name of the source field in the ChartData table. The "Whereclause" is used in certain embodiments, the "Whereclause" specifies an optional filter for the calculated field. Attributes defined in CalculatedFleid may contain the optional filter. In this situation, the optional filter is a property of the calculated field. The purpose of this filter is to allow sharpening the focus of an attribute. In other words, restricting the attribute to a subset of the population. Examples of filtered attributes in a business organization may be:

Employee satisfaction of top performers, salary of poor performers, and attrition among Ivy League scholars.

Exemplary field types which could be used in step 606 are described below in Chart 3.

Exemplary Field Descriptions
Chart 3

| Field Name | Description |
| --- | --- |
| Cross time slice filter | Identifies nodes which satisfy criteria in the previous time slice and in the current time slice. The criteria can be against any attribute in ChartData table. This field type may be useful for finding nodes which have changed in a certain way between time slices. For instance, this type of field might be used to identify nodes which have increased in cost or decreased in efficiency. |
| Move in | Identifies nodes which have moved into an area of the hierarchy. Every parent node may receive a count of nodes which have moved into the parent mode's area of the hierarchy. |
| Move out | Identifies nodes which have moved out of an area of the hierarchy. In certain embodiments, every parent node receives a count of nodes which have moved out of the parent mode's area of the hierarchy. |
| Addition | Identifies nodes which have been added to the hierarchy. Every node which is in the current time slice but not in the previous, will be flagged. For instance, such nodes may receive a "1" in this calculated field. |
| Raw | Copies raw data from ChartData table to CalculatedFieldData table. This field is useful for bringing over attributes of nodes for further processing, such as summary and filtering calculations. |
| Filter | Identifies nodes which meet the filter criteria and flags such nodes. For instance, in certain embodiments, a "1" may be written to this type of field. |

Figure 7:
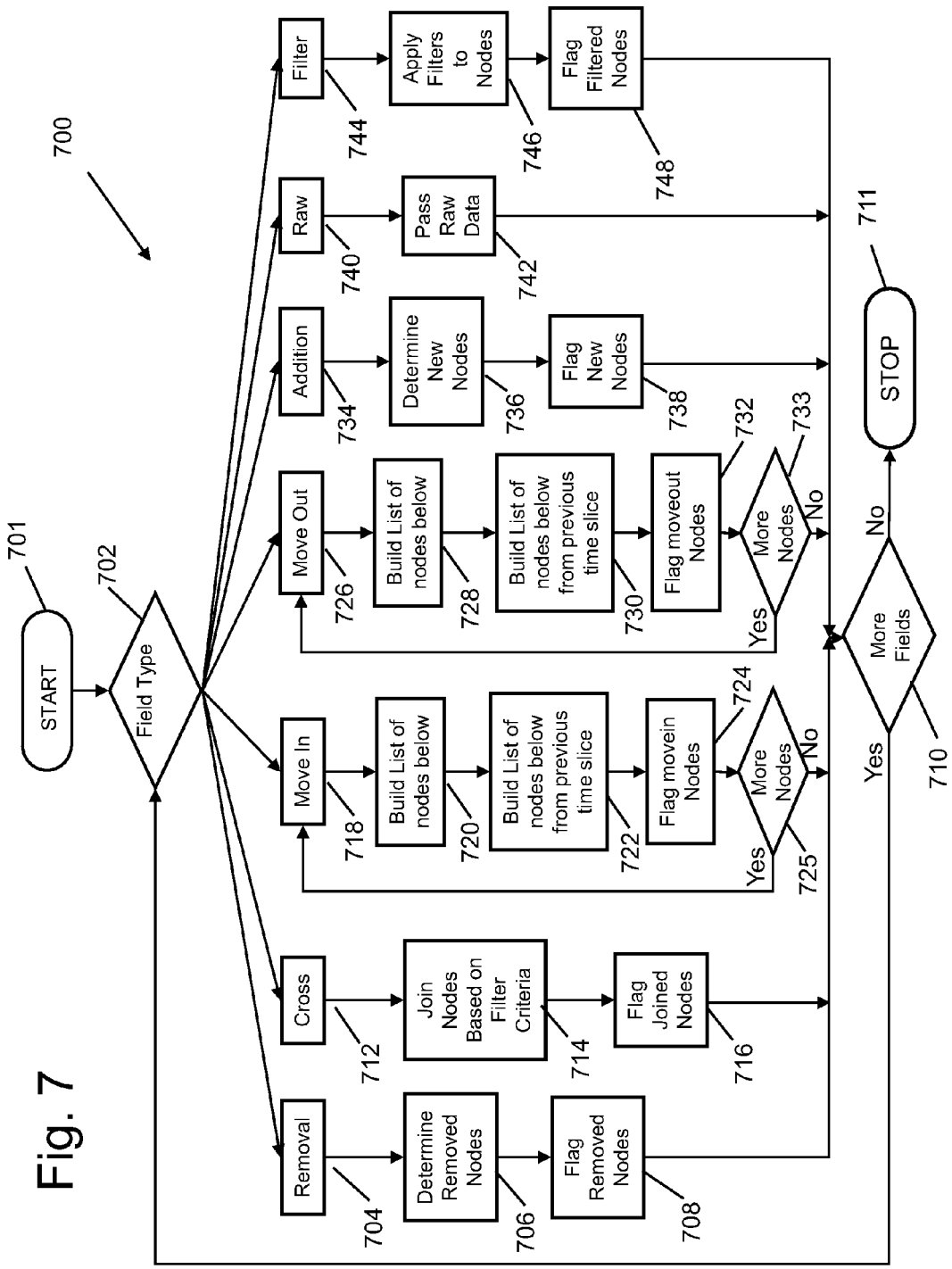
FIG. 7 is a flowchart illustrating a subprocess which may be incorporated into the flowchart illustrated by FIG. 6.

FIG. 7 illustrates one sub-process for comparing the data by using field definitions described in Chart 3.

Turning to FIG. 7, the subprocess 700 starts at step 701 and the first step is a switch step 702 which determines each field type in the ChartData table for each node and calculated field in the ChartData table and then routes the subprocess to the appropriate path based on the field type. Each of the paths writes the resulting attributes to the CalculatedFieldData table based on the definitions of the fields contained in the CalculatedField table (described in Chart 1).

For instance, if the field type is "removal," then the removal path 704 is followed. In step 706, the removed nodes are to be determined. In one embodiment, the removed nodes are determined by executing a Structured Query Language ("SQL") query against the ChartData table for nodes which exist in the previous time slice, but do not exist in the current time slice. Because the removed nodes are no longer in the time slice database, in certain embodiments, rows may be added to the CalculatedFieldData table as placeholders for the removed nodes. The rows are also flagged in step 708 as removed nodes for later processing. In certain embodiments, the flagging may be accomplished by writing a "1" to the associated row and column in the CalculatedFieldData table. In certain embodiments, the query may also have additional optional filter criteria applied to filter the query results based on the specific application or interest. The subprocess then continues to step 710.

If the field type is "cross," then the cross path 712 is followed. The cross nodes are nodes that have retained the same position within the hierarchy, but values may have changed. For instance, this type of field might be used to identify nodes which have increased in cost or decreased in efficiency between the time slices. In step 714, a SQL query is executed against the ChartData and the definition of filter criteria from Filter table. The nodes between the time slices are thus joined based on filter criteria. In step 716, the joined nodes are flagged and the path flows to step 710. In certain embodiments, the flagging may be accomplished by writing a "1" to the associated row and column in the CalculatedFieldData table.

If the field type is "move in," then the move in path 718 is followed. The move in nodes are nodes which have had child nodes "move in" under their branch. For instance, if the node represents a manager position, the "move in" field type would be a new employee position reporting to the manager position. In order to determine the "move in" nodes, in step 720, a list of all child nodes is built for the current node in the current time slice. In step 722, a list of all child nodes is built for current node in from a previous time slice. In step 724, the two lists are compared and the new or "movein" nodes are flagged. In certain embodiments, the flagging may be accomplished by writing a "1" to the associated row and column in the CalculatedFieldData table. In step 725, a check determines if there are more nodes in the hierarchy which have not been examined. If there are more unexamined nodes, the process loops back to the beginning of the move in path 718. If not, the process flows to step 710. The steps of step 720, step 722, and step 724 are recursive in nature in that these steps are repeated for every node in the hierarchy.

If the field type is "move out," then the move out path 726 is followed. The move out nodes are nodes which have had child nodes "move out" from their branch. For instance, if the node represents a manager position, the "move out" field type would be an employee position which no longer reports to the manager position. In order to determine the "move out" nodes, in step 728, a list of all child nodes is built for the current node in the current time slice. In step 730, a list of all child nodes is built for current node in from a previous time slice. In step 732, the two lists are compared and the "moveout" nodes are flagged. In certain embodiments, the flagging may be accomplished by writing a "1" to the associated row and column in the CalculatedFieldData table. In step 733, a check determines if there are more nodes in the hierarchy that have not been examined. If there are more unexamined nodes, the process loops back to the beginning of the move out path 726. If not, the process flows to step 710. The steps of step 728, step 730, and step 732 are recursive in nature in that these steps are repeated for every node in the hierarchy.

If the field type is "addition" then the addition path 734 is followed. The addition nodes are new nodes. In order to determine the "addition" nodes in certain embodiments, in step 736, an SQL query may be executed against the ChartData table for nodes which exist in he current time slice, but do not exist in the previous time slice. In step 738, the results of the query are flagged and the path flows to step 710. In certain embodiments, the flagging may be accomplished by writing a "1" to the associated row and column in the CalculatedFieldData table. In certain embodiments, the query may have additional optional filter criteria applied to filter the results based on the specific application or interest.

If the field type is "Raw" then a path 740 is followed. In step 742, the raw data field values from the specified ChartData table column is copied to the associated column and row in the ChartFieldData table. The step 742 is repetitive in nature in that this step is repeated for every node in the hierarchy for the current time slice.

If the field type is "filter," then the filter path 744 is followed. In step 746, the filters are applied to the nodes. In one embodiment, an SQL query is executed against the ChartData table for nodes that meet some or all of the filter criteria defined in the Filter table (or a portion of the Filter table). Such nodes are also flagged in step 748 as filtered nodes for later processing. In certain embodiments, the flagging may be accomplished by writing a "1" to the associated row and column in the CalculatedFieldData table. The subprocess then continues to step 710.

At step 710, a check is performed to see if all of the defined fields (or attributes) in the ChartData table for all of the nodes have been examined by the subprocess 700. If all fields for all nodes have been examined, the subprocess stops at step 711 and controls returns to the process 600. If all fields have not been examined, the subprocess 700 loops back to step 702 where the next field type for the next attribute is examined.

Turning back to FIG. 6 and specifically step 608 where the process 600 continues. In step 608, based on predefined filters from the Filter table, a set of hierarchical data for every filter is created and the data stored in a filtered database (e.g., the MetricData table). This filtering step is useful for viewing metrics which target a subset of the total data. In order to accomplish this step, for each filter defined in the Filter table, an SQL query against the ChartData table may be executed to retrieve a list of the nodes which satisfy the filter criteria. The results (of each predefined filter) are then written to the MetricData table. This filtering step allows an end user to apply these filters to any attribute they choose.

In step 610, summary or summation calculations on certain attributes are performed. This step performs aggregate processing against the current hierarchy, instead of a table. This step will result counts and summations for each node in the current hierarchy. For instance, if a summary field were defined as "Total weight," the field or attribute would contain the sum of weights for corresponding weight attribute for all nodes at or under the node containing "Total Weight." In certain embodiments, the Summary fields are defined in the Metric table and may have a column in MetricData table. The fields for this step in the Metric table are "Type" which defines the type of summary field (defined in Chart 4, below) and "SourceField" which specifies the name of the field in CalculatedFieldData to use as the source for calculating sums.

Thus, in certain embodiments, the nodes which satisfy the predefined metrics are retrieved and summation calculations are performed on the attributes associated with the nodes. Exemplary field types which could be used in step 610 are described in Chart 4.

Exemplary Field Type Descriptions (Defined in the Metric Table)
Chart 4

| Field Name | Description |
| --- | --- |
| Sum | This field type contains the summations of corresponding values upward throughout the hierarchy. The values in SourceField are summed upward throughout hierarchy. |
| Count | This field type holds counts upward throughout the hierarchy. Every node receives a count of all of the nodes beneath it in the hierarchy. |
| Raw | This field type allows the transferring of values directly from the CalculatedFieldData table. This field is useful for working with metrics that do not require summarized values. The values of these fields are copied form the field in CalculatedFieldData identified by SourceField. |

Figure 8:
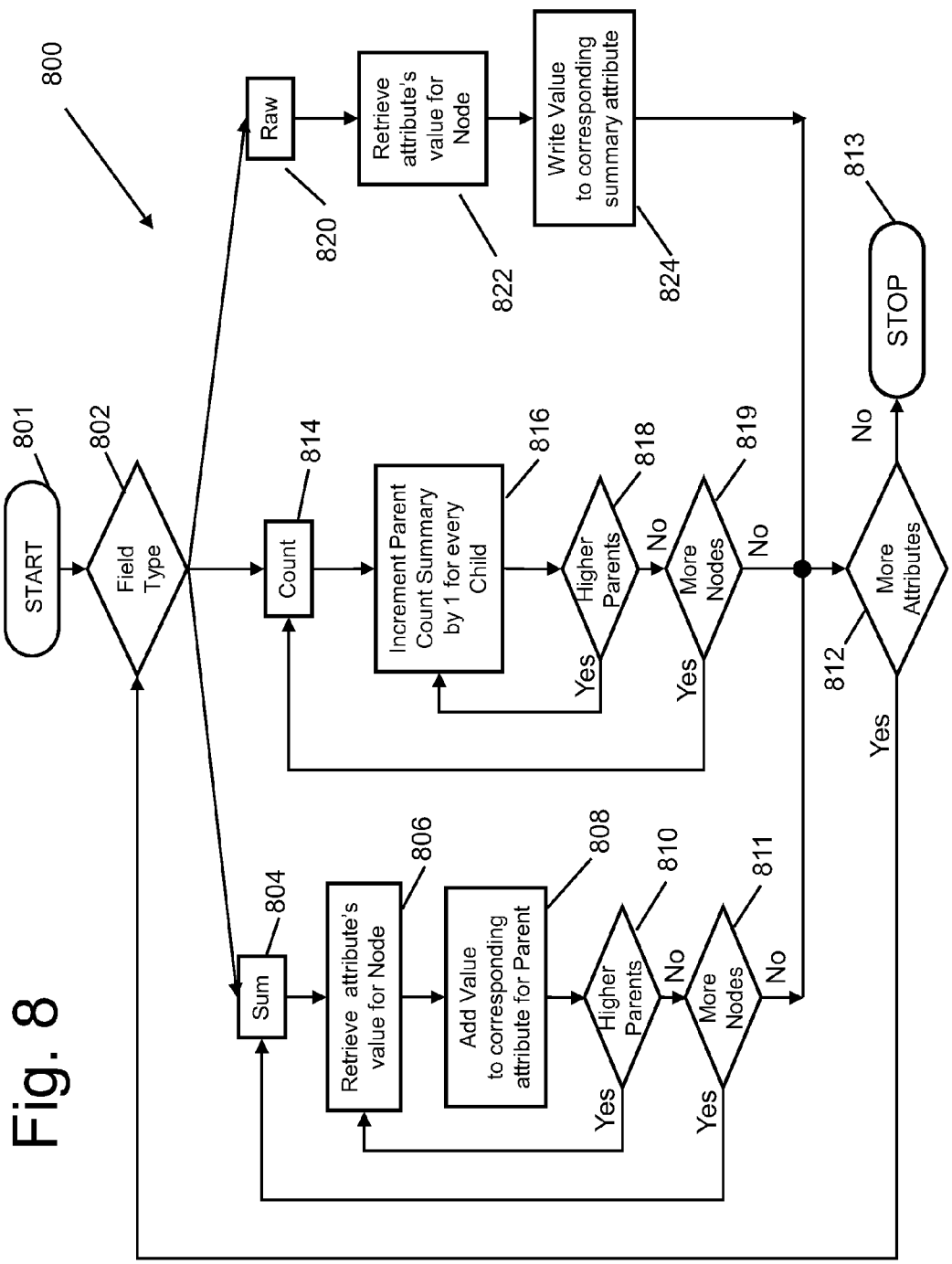
FIG. 8 is a flowchart illustrating a subprocess which may be incorporated into the flowchart illustrated by FIG. 6.

FIG. 8 illustrates the subprocess 800 which is an expansion of the step 610 of the process 600. The subprocess 800 starts at step 801 and the first step is a switch step 802 for determining summary field type for the current examined field. As explained above, the summary field types are defined in the Metric table. Step 802 then routes the subprocess to the appropriate path based on the defined field type. Each of the paths writes the resulting summation attributes to the MetricData table based on the definitions of the summary fields contained in the Metric table (described in Chart 1).

For instance, if the field type is "sum," then the summation path 804 is followed. In step 806, the value of summary attribute for the examined node is identified by the SourceField value in the CalculatedFieldData table. In step 808, the identified values are then added to the appropriate attribute of the parent (or parents) of the examined node in the MetricData table. The process then flows to step 810, where step 810 determines if there are higher levels of parents. If not, the process flows to step 811. If there are higher levels of parent nodes, then the process loops back to step 806, where the parent of the node is now examined and processed. At step 811, a check is performed to determine if there are any additional nodes to be examined or processed. If yes, then the process loops back to step 804. Otherwise the process flows to step 812. Essentially, steps 806, 808, 810 and 811 represent an iteration up the parent node chain until the top of the hierarchy is reached. For each parent node, the value is added to the appropriate summary field in the MetricData table.

If the field type is "Count," then the count path 814 is followed. In step 816, the value of count attribute for the examined node is incremented by one in the MetricData table. The process then flows to step 818, where step 818 determines if there are higher levels of parents. If not, the process flows to step 819. If there are higher levels of parent nodes, then the process loops back to step 816, where the parent of the node is now examined and processed. At step 819, a check is performed to determine if there are any additional nodes to be examined or processed. If yes, then the process loops back to step 814. Otherwise the process flows to step 812. Essentially, steps 816, 818 and 819 represent an iteration up the parent node chain until the top of the hierarchy is reached. For each parent node, the counts of the child nodes are added to the appropriate count field in the MetricData table to include child nodes and the parent node.

If the field type is "raw," then the raw path 820 is followed. In step 822, the value of raw attribute for the examined node is identified by the SourceField value in the CalculatedFieldData table. In step 824, the identified value is then passed to the appropriate attribute of the examined node in the MetricData table. The process then flows to step 812.

At step 812, a check is performed to see if all appropriate attributes of the nodes as defined in the Metrics table have been examined. In other words, for each defined field or attribute, the subprocess 800 iterates through all of the nodes. If all defined attributes have been examined, the subprocess stops at step 813 and controls returns to the process 600. If all predefined attributes have not been examined, the subprocess 800 loops back to step 802 where the next field type for the next node is examined.

Turning back to FIG. 6 and specifically step 612 where the process 600 continues. At this point in the process 600, the time slice databases contain a relatively large amount of data. In certain embodiments, much of this data may be accessed and display by the end user. However, in order to display and report averages, percents, rates, ratios, etc. an additional processing step may be performed in some embodiments. In step 612, formulas are applied to the MetricData table to generate new values which may be of interest to the end user. These new values are stored in the MetricDisplayData table (Chart 2). The formulas are configurable and are defined in the MetricDisplay table. In certain embodiments, the MetricDisplay table includes two fields: "Caption" which is the label used to display the particular metric to the end user, and "Formula" which is applied to format the values in the MetricData table to the MetricDisplayData table.

Figure 9:
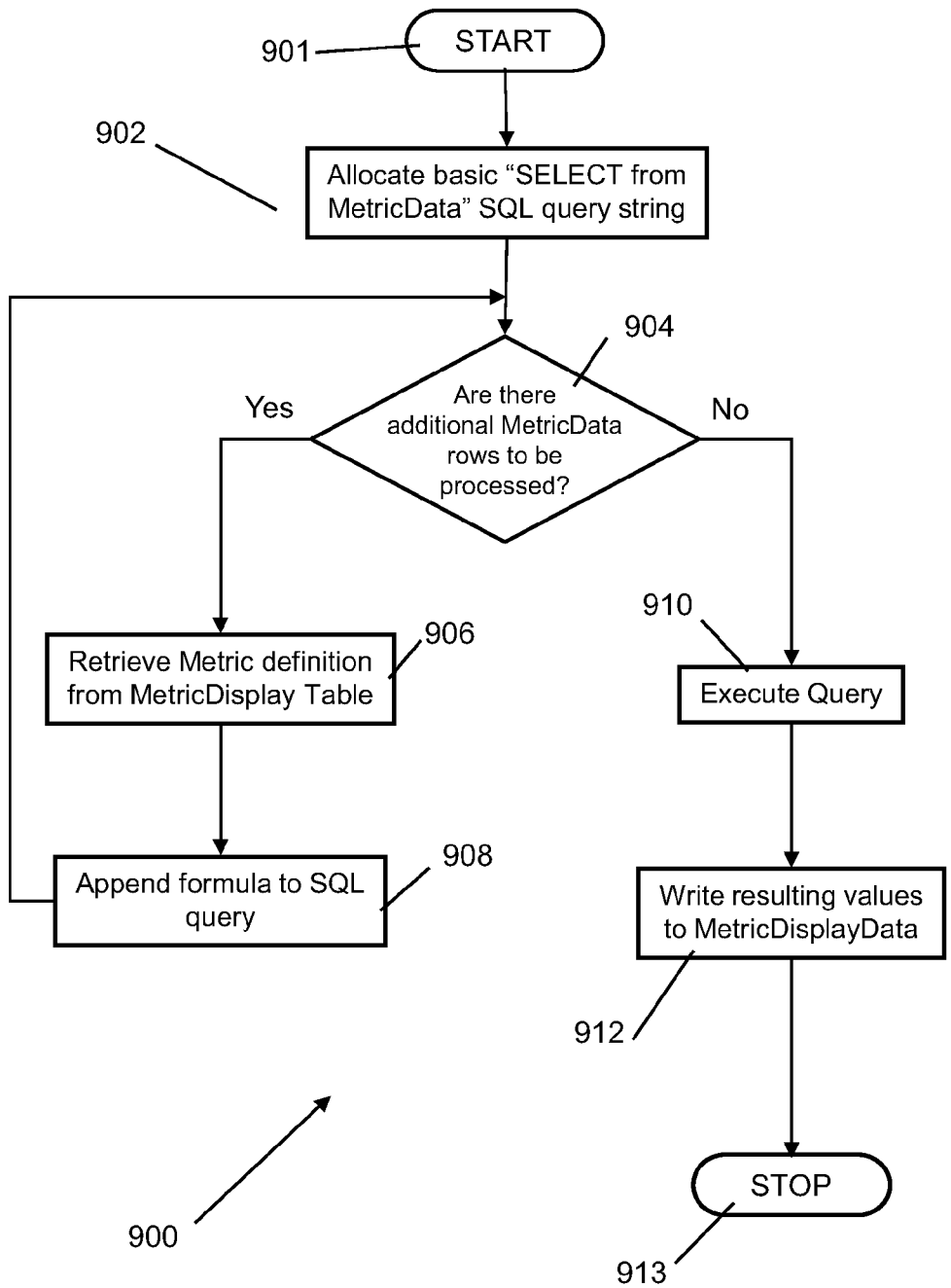
FIG. 9 is a flowchart illustrating a subprocess which may be incorporated into the flowchart illustrated by FIG. 6.

FIG. 9 illustrates the subprocess 900 which is an expansion of the step 612 of the process 600. The subprocess 900 reads the results of preliminary calculations contained in the MetricData table and formats the results into a form which is digestible by the end users. The process loops through the definitions in MetricDisplay and builds a SQL query to pull the appropriate information. For instance, headcount and terminations are preliminary attributes which may not have a significant relevance to the end user. So, this process may divide terminations by the headcount. The resulting attribute, Attrition may have relevance to the end user. The subprocess 900 starts at step 901. In this particular embodiment, the first step 902 issues a SELECT from MetricData SQL query string to create an initial (and mostly empty) query string. The purpose is to provide a structure to allow text to start be appended for a later query.

A decision step 904 decides if there are more MetricData rows to be processed. If yes, the process flows to step 906. In step 906, the appropriate formula definition from the MetricDisplay definition table is retrieved, such as a formula for an average of the particular attributes of interest. In step 908, the formula is then appended to an SQL query. The appended formula results in a column being added to the MetricDisplayData table. In certain embodiments, every row in the MetricDisplay table results in a column being created and populated in the MetricDisplayData table.

After the formula is appended to the SQL query string in step 908, the process flows back up to step 904. As described above, step 904 determines if there are additional MetricData rows to be processed. If not, then the process flows to step 910 where the SQL Query using the query string is executed. Until now, the subprocess 900 has been building a relatively large query string. In this step 910, the query string is executed. This query takes the preliminary attributes from the MetricData table and performs math calculations and/or formatting on the attributes. The resulting calculations and formatting values are written to the MetricDisplayData table in step 912. The subprocess 900 stops at step 913 and control flows back to the process 600.

The process 600 ends at step 613 resulting in the population of values in the MetricDisplayData table. In certain embodiments, the MetricDisplayData table is accessible to the end user via a web server as discussed in reference to FIG. 5. Using the metric display table, the end user can see the results of intensive analysis between different hierarchies. The end user can also see trends develop between various time slices.

Figure 10:
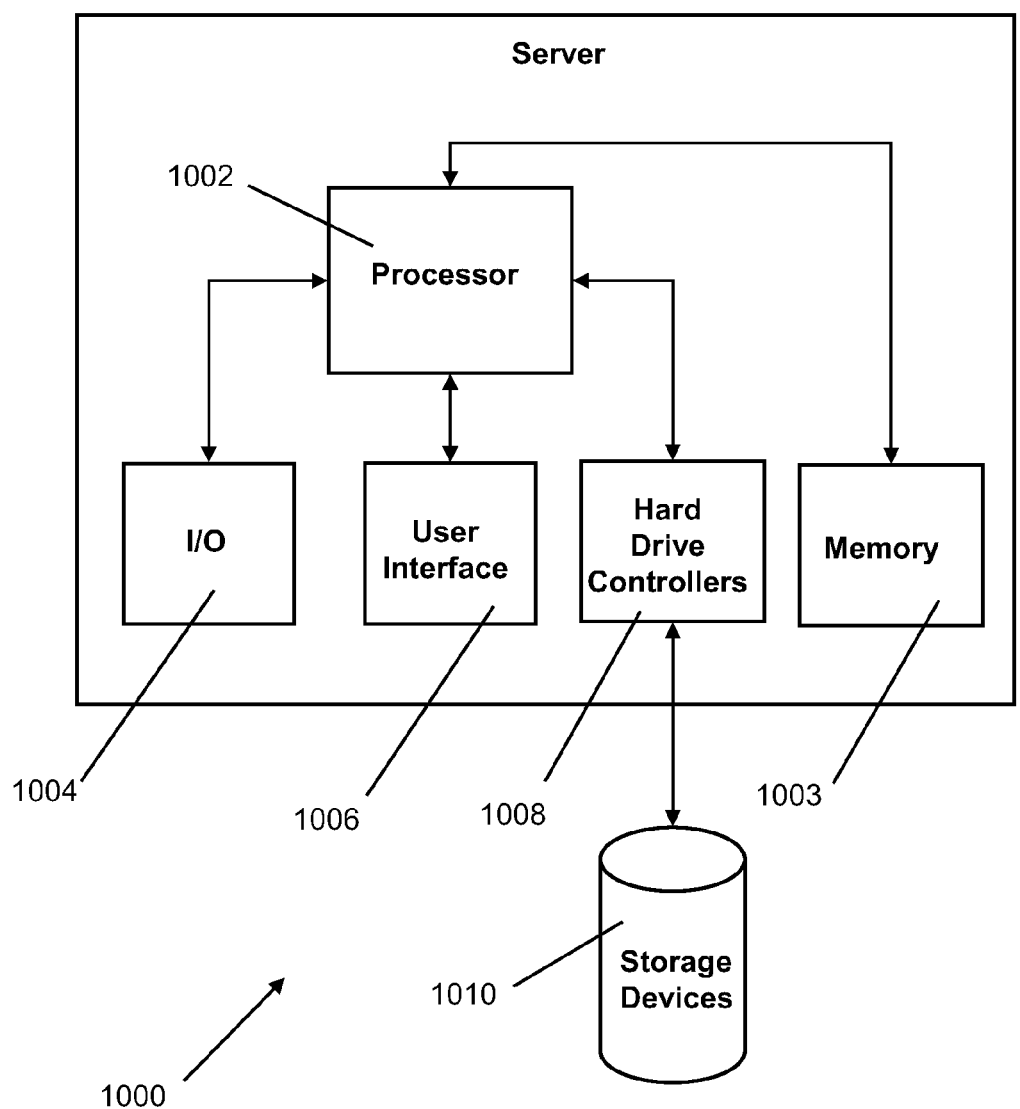
FIG. 10 is a conceptual diagram illustrating a computer system which may incorporate various aspects of the present invention.

As discussed above, the embodiments described herein may also be implemented on a computer or server as described above in reference to FIG. 5. One such server 1000 is conceptually illustrated in FIG. 10.

The server 1000 may be either a software application running on a computer, or one or a series of computers that link other computers or electronic devices together. In certain embodiments, the physical server 1000 may be a dedicated time slice database server. In other embodiments, the physical server 1000 may also incorporate a web server and other applications to allow the end user access to the time slice databases.

Hardware requirements for the server 1000 will vary and may depend on the size of the time slice databases. In certain embodiments, the server 1000 will provide access to the time slice databases as a service to many users over the Internet or Intranet network as described above in reference to FIG. 5. A fast processor 1002 may be desirable to perform certain of the processes discussed above. However, once the time slice databases have been established, the processor 1002 requirements may drop substantially.

The processor 1002 may be coupled to some form of computer memory 1003 which loads software and/or firmware instructions so that the processor 1002 can perform the processes or portions of the processes described herein. Additionally, fast network connections and high I/O 1004 throughput may be desirable in certain embodiments when there are many end users. In certain embodiments, the server 1000 may be accessed over a network and thus may run in headless mode without a user interface, such as a monitor or input device 1006. In other embodiments, the server 1000 uses a user interface such as the monitor or input device 1006. The server 1000 may have hard drive controllers 1008 to control storage devices 1010 which store the time slice databases. In certain embodiments, the server 1000 may be rack-mounted and situated in server rooms for convenience and to restrict physical access for security.

The embodiments described in this application may be used for a wide variety of uses when analysis of hierarchical data over time (or other dimensions) is desirable. Certain business uses and specific methods which may use certain of the various embodiments described herein are detailed in the co-pending application entitled "SYSTEMS AND METHODS OF ANALYZING CHANGES AND DATA BETWEEN WORKFORCE HIERARCHIES," filed on the same date as the present application and which is incorporated by reference for all purposes and assigned to the same owner as the present application.

The attributes and/or filters described in the above co-pending application may be applied to the processes described herein to produce the results described in the co-pending application.

Other embodiments may include a computer implemented method of analyzing hierarchical data. The method comprises: providing a database of previous time slice data, receiving new time slice data, comparing the new time slice data to the database of previous time slice data, generating additional attributes, incorporating the additional attributes and the new time slice data into the database. Additional steps may also include performing trend analysis on the database to analyze hierarchical data over time or a third dimension. In some embodiments, the generating additional attributes is controlled by one or more set of user configurable filters. In some embodiments, the additional attributes may include structural attributes, structural difference attributes, in-slice calculations, and cross-slice calculations. In yet, other embodiments, the additional attributes may be formatted according to user configurable filters before inclusion in the time slice database.

Although representative embodiments and advantages have been described in detail, it should be understood that various changes, substitutions and alterations can be made herein without departing from the spirit and scope of the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure that processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

Any combination of the features discussed above are within the scope of certain embodiments of the present invention. Thus, a feature disclosed in reference to one embodiment may be combined with another embodiment. Furthermore, combinations of disclosed features and alternative features are within the scope of certain embodiments of the present invention.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

What is claimed is:

1. A computer implemented method for analyzing hierarchical data from at least two points in time, the method comprising:
   providing data representing nodes of a first hierarchy including a first node,
   providing data representing first attributes associated with the nodes of the first hierarchy,
   receiving data representing nodes of a second hierarchy including a second node that is a parent node to at least one of the nodes in the first hierarchy,
   receiving data representing second attributes associated with the nodes of the second hierarchy, at least some of the second attributes being the same as corresponding first attributes,
   providing at least one configurable set of criteria defining particular attributes from the first attributes and the second attributes,
   comparing the data representing the nodes of the second hierarchy to the data representing nodes of the first hierarchy,
   determining that the first node represents a particular position in the first hierarchy and that the second node represents another particular position in the second hierarchy similar to the particular position in the first hierarchy using the comparison of the data representing the nodes of the second hierarchy to the data representing nodes of the first hierarchy,
   generating a first set of new attributes using the comparison of the data representing the nodes of the second hierarchy to the data representing nodes of the first hierarchy,
   determining a combination using the first set of new attributes for each node below the second node of the second hierarchy for each particular attribute in the configurable set of criteria, and
   storing the combination.

2. The method of claim 1, comprising storing the combination in databases to allow an end user to analyze differences between the first attributes of the first hierarchy with the second attributes of the second hierarchy.

3. The method of claim 1, comprising:
   calculating statistical values using the combination; and
   storing the statistical values in databases.

4. The method of claim 1, wherein comparing the data representing the nodes of the second hierarchy to the data representing nodes of the first hierarchy comprises:
   examining each field type of each second attribute associated with the second hierarchy, and
   creating new attributes using the examination of each field type of each second attribute.

5. The method of claim 4, wherein comparing the data representing the nodes of the second hierarchy to the data representing nodes of the first hierarchy comprises:
   determining that one of the field types is removal,
   determining which nodes in the first hierarchy do not have a corresponding node in the second hierarchy, and
   flagging each node in the first hierarchy that does not have a corresponding node in the second hierarchy or creating a new flagged node for each node in the first hierarchy that does not have a corresponding node in the second hierarchy.

6. The method of claim 4, wherein comparing the data representing the nodes of the second hierarchy to the data representing nodes of the first hierarchy comprises:
   determining that one of the field types is addition,
   determining which nodes in the second hierarchy that do not have a corresponding node in the first hierarchy, and
   flagging each node in the second hierarchy that does not have a corresponding node in the first hierarchy.

7. The method of claim 4, wherein comparing the data representing the nodes of the second hierarchy to the data representing nodes of the first hierarchy comprises:
   determining that one of the field types is moveout,
   (a) building a list of all nodes under the second node in the second hierarchy,
   (b) building a list of all nodes under the first node in the first hierarchy,
   (c) flagging each node under the first node in the first hierarchy that does not have a corresponding node in the second hierarchy, and
   (d) repeating the above steps (a) through (c) for every node in the first hierarchy.

8. The method of claim 4, wherein comparing the data representing the nodes of the second hierarchy to the data representing nodes of the first hierarchy comprises:
   determining that one of the field types is movein,
   (a) building a list of all nodes under the second node in the second hierarchy,
   (b) building a list of all nodes under the first node in the first hierarchy,
   (c) flagging each node under the second node in the second hierarchy that does not have a corresponding node in the first hierarchy, and
   (d) repeating the above steps (a) through (c) for every node in the hierarchy.

9. The method of claim 4, wherein comparing the data representing the nodes of the second hierarchy to the data representing nodes of the first hierarchy comprises:
   determining that one of the field types is a cross time slice,
   determining if the attribute of the second hierarchy is to be joined with an attribute of the first hierarchy using data from the configurable set of criteria, and
   flagging each node in the second hierarchy to be joined.

10. The method of claim 4, wherein comparing the data representing the nodes of the second hierarchy to the data representing nodes of the first hierarchy comprises:
    determining that one of the field types is raw, and
    copying raw field values from the second attributes associated with each of the nodes of the second hierarchy.

11. The method of claim 4, wherein comparing the data representing the nodes of the second hierarchy to the data representing nodes of the first hierarchy comprises:
    determining that one of the field types is a filter defined in the configurable set of criteria,
    determining if the attribute of the second hierarchy meets criteria defined in the configurable set of criteria, and flagging each attribute meeting criteria defined in the configurable set of criteria and calculating a second set of new attributes by filtering the first set of new attributes using the configurable set of criteria.

12. The method of claim 1, wherein the particular position in the first hierarchy is the same as the other particular position in the second hierarchy.

13. The method of claim 12, wherein the particular position comprises a title.

14. The method of claim 1, wherein the second node comprises a root node of the second hierarchy.

15. The method of claim 1, wherein generating a first set of new attributes using the comparison of the data representing the nodes of the second hierarchy to the data representing nodes of the first hierarchy comprises generating a first set of new attributes using the comparison of the data representing the nodes of the second hierarchy to the data representing nodes of the first hierarchy and the determination that the first node represents a particular position in the first hierarchy and that the second node represents another particular position, similar to the particular position, in the second hierarchy.

16. The method of claim 15, wherein calculating a second set of new attributes by filtering the first set of new attributes using the configurable set of criteria comprises:
   determining an attribute from the configurable set of criteria,
   determining which of the nodes in the second hierarchy have the attribute, and
   determining a combination for all parent nodes in the second hierarchy that have the attribute.

17. The method of claim 16, wherein determining a combination for all parent nodes in the second hierarchy that have the attribute comprises:
   determining, for each parent node, each corresponding child node that has a field type of an attribute that corresponds with the attribute from the set of criteria, and
   generating the second set of attributes for each determined child node and each parent node that has the field type of an attribute that corresponds with the attribute.

18. The method of claim 1, comprising:
   calculating a second set of new attributes by filtering the first set of new attributes using the configurable set of criteria, wherein determining the combination using the first set of new attributes for each node below the second node of the second hierarchy for each particular attribute in the configurable set of criteria comprises determining the combination using the second set of new attributes for each node below the second node of the second hierarchy.

19. The method of claim 1, comprising:
   determining a combination for each parent node in the second hierarchy.

20. The method of claim 1, wherein generating the first set of new attributes using the comparison of the data representing the nodes of the second hierarchy to the data representing nodes of the first hierarchy comprises generating the first set of new attributes using the comparison of the data representing the nodes of the second hierarchy to the data representing nodes of the first hierarchy for each of the particular attributes in the configurable set of criteria.

21. A method for analyzing time dependent trends from two dimensional hierarchical data, the method comprising:
   receiving first data from a first database, the first data containing previous time-dependent data representing a hierarchy of nodes, first attributes for the hierarchy of nodes, first combination attributes for the hierarchy of nodes, and first structural attributes for the hierarchy of nodes,
   receiving second data containing current time-dependent data representing a new hierarchy of nodes and second attributes for the new hierarchy of nodes,
   determining second combination attributes, for at least some of the nodes in the new hierarchy of nodes, using a first set of predefined criteria and the second attributes for the corresponding child nodes of the respective node,
   determining second structural attributes for all of the nodes in the second hierarchy of nodes using a second set of predefined criteria,
   comparing the first structural attributes with the second structural attributes to determine which nodes in the first hierarchy correspond to nodes in the second hierarchy,
   determining, for each node in the new hierarchy of nodes that corresponds to one of the nodes in the hierarchy of nodes, differences between attributes of the nodes in the hierarchy of nodes and attributes of the nodes in the new hierarchy of nodes using a third set of predefined criteria,
   updating the first database using the second data, the second combination attributes, the second structural attributes, and the differences between attributes of the nodes in the hierarchy of nodes and attributes of the nodes in the new hierarchy of nodes, and
   providing the second data, the second combination attributes, the second structural attributes, and the differences between attributes of the nodes in the hierarchy of nodes and attributes of the nodes in the new hierarchy of nodes to an end user to perform time dependent trend analysis.

22. The method of claim 21, wherein determining differences between attributes of the nodes in the hierarchy of nodes and attributes of the nodes in the new hierarchy of nodes comprises determining differences between first attributes and second attributes other than the first structural attributes and the second structural attributes.

23. The method of claim 21, wherein determining differences between attributes of the nodes in the hierarchy of nodes and attributes of the nodes in the new hierarchy of nodes comprises determining differences between the first structural attributes and the second structural attributes.

24. The method of claim 21, comprising:
   determining, for at least some of the nodes in the new hierarchy of nodes, third combination attributes using the differences for the corresponding child nodes of the respective node.

* * * * *

UNITED STATES PATENT AND TRADEMARK OFFICE
CERTIFICATE OF CORRECTION

PATENT NO.        : 9,002,845 B1
APPLICATION NO.   : 13/783386
DATED             : April 7, 2015
INVENTOR(S)       : Ross Melbourne, Brad Winsor and Lois Melbourne Page 1 of 1

It is certified that error appears in the above-identified patent and that said Letters Patent is hereby corrected as shown below:

In the Claims

Column 16, line 46, Claim 8, after "the" insert --second--.

Signed and Sealed this
Thirteenth Day of October, 2015

Michelle K. Lee
*Director of the United States Patent and Trademark Office*